| United States Patent [19] | [11] 3,997,624 |
| --- | --- |
| Hudgin | [45] Dec. 14, 1976 |

[54] POLYETHYLENE WAXES

[75] Inventor: Donald E. Hudgin, Princeton Junction, N.J.

[73] Assignee: Princeton Polymer Laboratories, Incorporated, Princeton, N.J.

[22] Filed: Oct. 1, 1975

[21] Appl. No.: 618,677

[52] U.S. Cl. .................... 260/683.15 R; 526/352
[51] Int. Cl.$^2$ .......................................... C07C 3/10
[58] Field of Search ............ 260/683.15 R; 526/352

[56] References Cited

UNITED STATES PATENTS

| 3,714,135 | 1/1973 | Pfannmueiler et al. ........... 526/352 |
| 3,835,107 | 9/1974 | Stark et al. ........................ 526/352 |
| 3,862,257 | 1/1975 | Buben et al. ............. 260/683.15 D |

*Primary Examiner*—C. Davis
*Attorney, Agent, or Firm*—Cushman, Darby & Cushman

[57] ABSTRACT

Low molecular weight ethylene homo and copolymer waxes are prepared at pressures below 1000 psi and at temperatures below 120° C. using free radical catalysts having 10-hour half-lifes at not over 60° C.

27 Claims, No Drawings

POLYETHYLENE WAXES

ART CONSIDERED BEFORE FILING THIS CASE

| | | |
|---|---|---|
| Erchak | 2,504,400 | April 18, 1950 |
| Erchak | 2,683,141 | July 6, 1954 |
| Newberg | 2,706,719 | April 19, 1955 |
| Friedlander | 2,728,756 | December 27, 1955 |
| Wilson | 2,754,278 | July 10, 1956 |
| Field | 2,771,463 | November 20, 1956 |
| Richard | 2,852,501 | September 16, 1958 |
| Bestian | 2,999,856 | September 12, 1961 |
| Heines | 3,222,336 | December 7, 1965 |
| Reding | 3,299,177 | January 17, 1967 |
| Block | 3,398,131 | August 20, 1968 |
| Wisseroth | 3,503,944 | March 31, 1970 |
| Gasperi | 3,503,949 | March 31, 1970 |
| Matsumura | 3,513,150 | May 19, 1970 |
| Buechner | 3,557,074 | January 19, 1971 |
| Eberhardt | 3,567,703 | March 2, 1971 |
| Tani | 3,576,794 | April 27, 1971 |
| Bearden | 3,576,902 | April 27, 1971 |
| Ilnyckyj | 3,591,502 | July 6, 1971 |
| Screltas | 3,639,380 | February 1, 1972 |
| Karapenka | 3,709,853 | January 9, 1973 |
| Langer | 3,763,131 | October 2, 1973 |
| The Oil and Gas Journal | Page 63 | November 23, 1970 |
| Soap/Cosmetics/ Chemical Specialties | Pages 41–44 | September 1971 |

The present invention relates to a process for preparing ethylene homo and copolymer waxes at low pressures and low temperatures.

Much work has been done in the past in making polyethylene waxes by various techniques. Most of this work has involved the use of very high pressures, e.g. up to 2500 atmospheres and high temperatures, e.g. up to 250° C. with a free radical catalyst. Erchak U.S. Pat. No. 2,504,400 is an early example of such a patent and employs temperatures of 140°–200° C and 425 to 475 atmospheres.

Other workers have made polyethylene waxes at low temperatures and pressures but not with free radical catalysts. Instead these workers have employed other types of catalysts such as metallic based catalysts, e.g. Ziegler catalysts. The metallic based catalysts pose difficulties in metallic residue removal from the polymer product. Also in general it is more difficult to carry out copolymerizations with the metallic based catalysts.

Newberg U.S. Pat. No. 2,706,719 discloses polymerizing ethylene at a temperature above 70° C. and a pressure between 750 and 30,000 psig in the presence of free radical catalysts and a petroleum wax. In general, the half lifes of the peroxy catalysts in Newberg are above 60° C. Additionally Newberg is restricted to having a petroleum wax preferably a paraffin wax present. In fact the petroleum wax is at least 70% of the mixture of ethylene polymer and petroleum wax. Furthermore, the temperature of reaction is limited by the fact that the petroleum wax must be molten.

Friedlander U.S. Pat. No. 2,728,756 prepares ethylene polymers using di-t-butyl peroxydicarbonate as a catalyst. This catalyst has a 10-hour half life at 48° C. Friedlander polymerizes at a temperature of 1000 to 10,000 psi and produces products of quite high specific viscosities, well beyond the low molecular weight polyethylene wax range. Friedlander states he can use solvents in his polymerization but does not mention specific solvents.

Tani U.S. Pat. No. 3,576,794 discloses the preparation of waxes using a chloroalkane as a co-reactant in the presence of a free radical catalyst at a temperature of 75° to 250° C. and a pressure of 80 to 500 kg/cm$^2$. A pressure of 80 kg/cm$^2$ is above 1100 psi. The catalysts in Tani decompose above 70° C. Tani also points out that there were two kinds of similar waxes previously known, one by thermally cracking high molecular weight polyethylene and the other by polymerizing ethylene with a saturated C—H—O compound of aralkene in the presence or absence of a free radical catalyst at a pressure of 100 to 1000 atmospheres and a temperature of 100° to 300° C. By necessity the product of Tani contains chlorine which is undesirable for some purposes.

Ilnyckyj U.S. Pat. No. 3,591,502 discloses making copolymers of ethylene and ethylenically unsaturated ketones which copolymers have molecular weights of 1000 to 50,000. The reaction is preferably carried out in a hydrocarbon solvent and with a wide variety of free radical catalysts at a wide variety of temperatures. It is indicated that the temperature should preferably be such that the catalyst half life is ¼ to 2 hours. In the working examples there is used di-t-butylperoxide (which has a 10-hour half life above 115° C.) and a temperature of 310° F. (about 154° C).

It has now been found that ethylene can be homopolymerized or copolymerized with vinyl acetate, acrylic acid, methacrylic acid, maleic anhydride or an alpha monoolefin such as propylene, butylene, amylene or 1-decene at a pressure of 300 to 900 psi, preferably 600 to 900 psi, and a temperature of about 25° to 120° C. using a free radical catalyst having a 10-hour half life of 30° to 60° C. in the presence of an inert solvent or chain transfer solvent to produce waxes having a molecular weight of 1000 to 10,000. The waxes produced are high quality crystalline waxes comparable to a high quality Fischer-Tropsch wax. The use of highly active free radical catalysts allows the conditions of polymerization to be much less stringent than with less active free radical catalysts.

The term 10-hour half life means the temperature at which the free radical catalyst will have lost half of its initiating power in 10 hours. Examples of free radical catalysts useful in the process of the present invention are tertiary butyl peroxypivalate (TBPP) (sold by the Lucidol Division of Pennwalt Corp. as Lupersol 11, 10 hour half life 57° C.; dicyclohexyl peroxy-dicarbonate (DCPC) sold by the Lucidol Division of Pennwalt Corp. as Luperox 229, 10 hour half life 43° C.); 2,4-dichlorobenzoyl peroxide, 10 hour half life 54° C., t-butyl peroxyneodecanoate, 10 hour half life 47° C., t-butyl-peroxyneopentanoate 10 hour half life 54° C., t-butyl peroxyneodecanoate 10 hour half life 49° C., 2,5-dimethylhexane-2,5-diperoxyneopentanoate, 10 hour half life 51° C., 2,5-dimethylhexane-2,5-diperoxyneooctanoate, 10 ten hour half life 42° C.; 2,5-dimethylhexane-2,5-diperoxyneodecanoate, 10 hour half life 39° C., 2,5-dimethylhexyne-3-2,5-diperoxyneopentanoate, 10 hour half life 50° C.; 2,5-dimethylhexyne-3-2,5-diperoxyneooctanoate, 10 hour half life 39° C., 2-t-butylazo-2-hydroperoxy-4-methyl pentane, 10 hour half life 36° C., 2,5-dimethylhexyne-3-2,5-diperoxyneodecanoate 10 hour half life 38° C., 2,7-dimethyloctane-2,7-diperoxyneopentanoate, 10 hour half life 50° C., 2,7-dimethyloctane-2,7-diperoxyneooctanoate, 10 hour half life 42° C., acetyl sec.-heptyl sulfonyl peroxide, 10 hour half life 31° C., 2,7-dimethyloctane-2,7-diperoxyneodecanoate, 10 hour half life 38° C., diisobutyryl peroxide, 10 hour half life 34° C., diisononanoyl peroxide, 10 hour half life 59° C., di-sec.-butyl peroxydicarbonate, 10 hour half life 45° C., diisopropyl peroxydicarbonate 10 hour half life 46° C., acetyl cyclohexanesulfonyl peroxide, 10 hour half life 31° C., and 2-t-butylazo-2-cyano-4-methoxy-4-methylpentane, 10 hour half life 55° C. Preferably the free radical catalysts are peroxy compounds or azo compounds and preferably they have 10 hour half lifes between 43° and 57° C.

The solvent employed should have a molecular weight below 200. Thus there can be used hydrocarbon solvents, e.g. alkanes having 5 to 10 carbon atoms such as pentane, hexane, octane and decane, aromatic hydrocarbons such as benzene and toluene, cycloalkanes, e.g. cyclohexane, esters (including cyclic ethers) dipropyl ether, dibutyl ether, propylene oxide, dioxolane, dioxane and tetrahydrofuran, ketones, e.g. acetone or methyl ethyl ketone and alkyl esters of alkanoic acids such as methyl acetate, ethyl acetate, butyl acetate, methyl propionate, ethyl butyrate and amyl acetate. The preferred solvent is tetrahydrofuran since it results in the highest yields, in some case as much as 3 times or more than that of other solvents. In fact one of the advantages of the present invention is the higher yields based on the solvent employed.

In some cases a small amount of solvent is occluded in the polymer, e.g. in an amount up to 10% by weight of the polymer. This results in a lower melting point.

The amount of solvent is not critical. Usually enough solvent is employed to keep the mixture fluid during the reaction. For example there can be used solvent in an amount of 2 to 100 times the weight of product, but this range can be varied.

The amount of catalyst also is not critical and can be that conventionally employed in the art, e.g. 0.1 to 20 parts per 100 parts of polymer produced. There can be used incremental additions of catalyst. In such cases much less catalyst is required than with one shot addition of catalyst.

As indicated, the temperature can be from 40° to 120° C. Preferably the temperature is not over 70° C.

When copolymers are prepared the copolymerizing compound can be present in an amount to provide up to 50 mol % of the copolymer but preferably the copolymerizing compound is present in an amount of not over 30 mol % of the copolymer. Below 2 mol % of copolymerizing compound in the copolymer there usually is not significant modifying effect over ethylene homopolymers two or more copolymerizing monomers can be employed but in such case the total amount of copolymerizing monomers should not provide over 50 mol % of the polymer, the balance being ethylene units. The time of reaction in the examples was 6–27 hours. This time can be shortened considerably, e.g. to 1–2 hours or even shorter when employing a continuous procedure.

The polymerization temperature can range from about 25° to 120° C. but usually is carried out with an upper temperature limit of 40° to 70° C.

Although this invention is preferably used to make wax homopolymers of ethylene of varying properties, it also is effective in making a variety of copolymers as indicated above. Depending on the comonomer used as well as polymerization conditions, a variety of wax products can be made which can be utilized in a number of commercial end uses such as hot melt adhesives and coating, viscosity index improvers, emulsifiable waxes and plasticizers.

In general, the polymerizations are preferably carried out as follows:

Solvent and comonomer (if desired) and catalyst are charged to a stainless steel pressure vessel which is equipped with a stirrer. The vessel is pressured with ethylene and the temperature of the pressure vessel is then brought to the desired reaction temperature. The vessel is held at the desired temperature during the reaction time. At the end of the reaction time, the vessel is depressured, cooled and the contents discharged into an open container. The solvent is then evaporated off and the wax product is melted and poured into a container, where it is allowed to solidify into a solid slab of wax.

The above procedure may be modified a number anumber of ways. For example, the pressure of the vessel may be maintained as the ethylene is consumed by periodically repressuring with additional ethylene. Also the process lends itself for continuous operation as indicated above, where, for example, a tubular reactor is suitable. Other possible modifications include bringing the vessel up to temperature before pressurizing the vessel or injecting the catalyst into the vessel after it is pressurized. Suitable other modifications will occur to those skilled in the art.

As previously indicated, compared to other solvents tetrahydrofuran has given surprisingly high yields of product which was completely unexpected.

The temperature used during the reaction will depend largely on the type of initiator employed. Although this invention is concerned with highly active free radical catalysts as indicated useful catalysts can vary in 10-hour half lives from 30° to 60° C. and this difference will be reflected in the reaction temperature used. In general, the temperature of the reaction can vary between 20° C. and 120° C., depending on catalyst and other reaction conditions.

The time of reaction will depend upon, and is interrelated to, the temperature of the reaction, the choice of catalyst and the pressure employed. Also, as mentioned above, if increments of catalyst are periodically added during the time of the reaction, the total time of reaction can be shortened.

The products of this invention have a wide variety of end uses. Among the important uses are as coatings for paper containers, waxed paper for packaging, candles, waterproofing textiles, hot melt coatings and adhesives, can linings, cosmetics, electrical insulation, wax emulsions, printing inks, textile finishes and as a plastics modifier.

Unless otherwise indicated all parts and percentages are by weight.

The invention will be further understood by reference to the following examples which include preferred embodiments of the invention. Example 2 is a comparison example employing benzoyl peroxide, a free radical catalyst outside the present invention.

EXAMPLES

No. 1. A 1 liter stirred Parr reactor (Parr Instrument Co., Model 4521) was charged with 500 ml pure hexane and 1 gram tertiary butyl peroxypivalate (Lucidol's Lupersol 11). The reactor was closed and purged with prepurified nitrogen for 30 minutes. The reactor was then pressured with ethylene to 600 psi. The stirrer was started and heating begun. The temperature was al-

TABLE II

| Example No. | Co-monomer | Amount of Co-monomer | Pressure Range (psi) | Temperature Range (°C.) | Time of Reaction (hours) | Weight of Co-polymer | Melting Range (Fisher-Johns)°C. | Density | Shore D Hardness | Amount of Comonomer in Co-polymer |
|---|---|---|---|---|---|---|---|---|---|---|
| | | | REACTION CONDITIONS | | | | PRODUCT PROPERTIES | | | |
| 19 | Vinyl Acetate | 10g. | 560–740 | 33–57° | 23½ | 23.6g. | 108° | 0.932 | 49 | 18.58 |
| 20 | Acrylic Acid | 10g. | 580–890 | 32–66° | 23½ | 61.8g. | 105–110° | 0.939 | 50 | 19.98 |
| 21 | Acrylo-nitrile | 10g. | 580–680 | 29–57° | 23½ | 3.0g. | 95° | Not Determined | Not Determined | About 500 |
| 22 | Maleic Anydride | 10g. | 560–770 | 34–67° | 23½ | 31.3g. | 113° | Not Determined | Not Determined | Not Determined | lowed to rise to 55°–60° C., where it was held for approximately 20 hours. The pressure during this time rose to a maximum of 820 psi.

The reactor was then cooled to room temperature, depressurized and opened. The contents of the reactor was a white gelatinous material, which was placed in a glass tray and the hexane allowed to evaporate, leaving the wax product nearly solvent free. The wax was then melted in a pyrex beaker on a hot plate which removed the last traces of solvent. The polyethylene wax weighted 36g., showed a melting point of 117° C., had a Shore D hardness of 52 and a density of 0.948.

The following Examples Nos. 2–18 used the same general procedure as in Example 1 with the changes noted.

EXAMPLE 23

Reagents:
500 ml. pure n-hexane
1 g. tertiary butylperoxy pivalate
Ethylene, c.p.

The hexane and peroxide catalyst were put into a liter Parr reactor, the reactor closed, stirrer started and then purged with prepurified nitrogen for 30 minutes. The purge was stopped and reactor pressured to 600 psi with ethylene. The heater was turned on and over a period of 22 hours the pressure rose to a maximum of 780 psi after which it dropped to 665 psi. During this period the temperature rose to a maximum of 70° C. At the end of the 22 hour reaction, the stirrer and heater

TABLE I

| Example No. | Pressure Range (psi) | Temperature Range (° C.) | Catalyst | Weight of Catalyst | Time of Reaction (hours) | Solvent | Weight of Polymer | Melting Range (Fisher-Johns)° C. | Density | Shore D Hardness |
|---|---|---|---|---|---|---|---|---|---|---|
| | REACTION CONDITIONS | | | | | | PRODUCT PROPERTIES | | | |
| 2 | 570–760 | 31–63° | DCPC[2] | 1g. | 23½ | Hexane | 36.1g. | 115° | 0.938 | 53 |
| 3 | 550–760 | 29–58° | Benzoyl Peroxide | 1g. | 23½ | Hexane | 5.1g. | 110–115° | — | 28 |
| 4 | 580–860 | 24–61° | TBPP[3] | 1g. | 23½ | Benzene | 22.0g. | 117–118° | 0.927 | 58 |
| 5 | 560–870 | 25–67° | TBPP | 1g. | 23½ | Tetrahydrofuran | 100.8g.[1] | 88–98° | 0.916 | 24 |
| 6 | 580–825 | 26–58° | 2,4-di-chlorobenzoyl peroxide | 1g. | 23½ | Hexane | 15.0g. | 115° | 0.965 | 40 |
| 7 | 330–710 | 26–63° | TBPP | 1g. | 23½ | Hexane | 26.0g. | 109–112° | 0.910 | 40 |
| 8 | 475–600 | 58–63° | TBPP | 1g. | 24 | Hexane | 40.6g. | 108–110° | 0.914 | 47 |
| 9 | 190–300 | 60–62° | TBPP | 1g. | 24 | Hexane | 12.0g. | 85–90° | 0.903 | 9 |
| 10 | 580–780 | 32–70° | TBPP | 1g. | 27 | Hexane | 65.1g. | 105–110° | 0.926 | 50 |
| 11 | 600–845 | 28–62° | TBPP | 1g. | 22 | Hexane | 50.0g. | 108–112° | 0.930 | 52 |
| 12 | 600–750 | 58–61° | TBPP | 1g. | 6 | Hexane | 17.6g. | 113–115° | 0.917 | 46 |
| 13 | 400–600 | 60–62° | TBPP | 1g. | 12 | Hexane | 22.1g. | 105–110° | 0.914 | 43 |
| 14 | 370–610 | 57–64° | TBPP | 1g. | 24 | Propylene oxide | 30.2g. | 110° | 0.917 | 58 |
| 15 | 270–610 | 55–63° | TBPP | 1g. | 24 | 1,3-Dioxolane | 54.1g.[1] | — | — | — |
| 16 | 430–600 | 60–63° | TBPP | 1g. | 24 | 4/1 mixture of Hexane and Tetrahydrofuran (by volume) | 43.8g.[1] | 98–100° | — | — |
| 17 | 185–600 | 59–62° | TBPP | 0.5g. | 24 | Hexane | 12.0g. | 100–105° | 0.949 | 25 |
| 18 | 410–600 | 60–61 | TBPP | 2.0g. | 24 | Hexane | 35.9g. | 112–114° | 0.928 | 29 |

[1]These polymers contained residual solvent
[2]Dicyclohexylperoxydicarbonate
[3]Tertiary butyl peroxy pivalate The following examples show how four comonomers were copolymerized with ethylene under similar conditions described in Example 1. Hexane was used as solvent and 1 gram tertiary butyl peroxypivalate was used as catalyst. The results show that in order to get good yields, the comonomer is critical. Thus acrylonitrile gave very poor yields of the waxy copolymer.

were turned off, the reactor cooled to 38° C. and then depressurized.

The contents of the reactor, which were very gelatinous, were placed in a pyrex dish and the hexane evaporated off under mild heat. The remaining polymer weighed 65.1 g. and melted (Fisher-Johns) at 105°–110° C. Other physical properties were as follows:

Shore D Hardness — 50
Density — 0.926

The wax produced was a high quality crystalline wax comparable to a high quality Fischer-Tropsch wax.

EXAMPLE 24

Reagents:
500 ml. ethyl acetate
1 g. tertiary butyl peroxy pivalate
Ethylene

The ethyl acetate and peroxide catalyst were put into a 1 l. Parr reactor, the reactor closed, stirrer started and then purged with prepurified nitrogen for 30 minutes. The purge was stopped and the reactor pressured to 600 psi with ethylene. The heater was turned on and the temperature brought to 60° C. in about 10 minutes. The temperature was then held close to 60° C. and the pressure held at 600 psi by repressuring periodically to 600 psi as the pressure dropped below 600 psi. These conditions were maintained for 24 hours. The stirrer and heater were then turned off, the reactor cooled to room temperature and then depressurized.

The contents of the reactor, which were very gelatinous, were placed in a pyrex dish and the ethyl acetate evaporated off under mild heat. The remaining polymer weighed 47.0 g. and melted at 105°–110° C. Other physical properties were as follows:

Shore D Hardness — 47
Density — 0.952

The wax produced was a high quality crystalline wax comparable to a high quality Fischer-Tropsch wax.

EXAMPLE 25

Reagents:
500 ml. acetone
1 g. tertiary butyl peroxy pivalate
Ethylene

The same procedure was followed as with Example 24 except for the use of acetone as the solvent. The polymer weighed 15.2 g. and had the following physical properties:

Melting range — 85°–90° C.
Density — 0.936
Shore D Hardness — 0

The P E wax thus produced was soft wax, with properties and feel of a microcrystalline wax.

EXAMPLE 26

Reagents:
500 ml. pure n-hexane
1 g. tertiary butyl peroxy pivalate
Propylene, c.p.
Ethylene, c.p.

The hexane and peroxide catalyst were put into a liter Parr reactor, the reactor closed, stirrer started and then purged with prepurified nitrogen for 30 minutes. The purge was stopped and the reactor pressured with propylene to 60 psi, followed by a pressuring with ethylene to a total of 600 psi. The heater was turned on and over a period of approximately 24 hours the pressure rose to a maximum of 895 psi., after which it dropped slowly to 580 psi. During this period the temperature rose to a maximum of 60° C., where it was held for most of the time of the reaction.

The product was worked up as previously described. The ethylene-propylene copolymer wax weighed 15.0 g. and had the following physical properties:

Melting range — 70°–75° C.
Density — 0.901
Shore D Hardness — 0

The product was a soft wax similar to commercial microcrystalline waxes.

EXAMPLE 27

Reagents:
500 ml. pure n-hexane
1 g. RA-55 (Lucidol's designation for 2-t-butylazo-2-cyano-4-methoxy-4-methylpentane)
Ethylene The hexane and azo catalyst were put into a liter Parr reactor, the reactor closed, stirrer started and then purged with prepurified nitrogen for 30 minutes. The purge was stopped and the reactor pressurized to 700 psi with ethylene. The heater was turned on and over a period of approximately 24 hours, the pressure rose to a maximum of 860 psi. The temperature rose to 61°, and it was held at 60°±2° C. for most of the time of the reaction. When the pressure dropped below 800 psi, it was periodically repressured to 800 psi. At the end of the reaction, the stirrer and heater were turned off, the reactor allowed to cool to room temperature and then depressurized.

The contents of the reactor were placed in a pyrex dish, the solvent allowed to evaporate under mild heat and the resulting polymer melted in an aluminum cup to form on cooling a solid block of wax. The polymer weighed 40.2 g. and had the following physical properties:

Melting range — 110°–115° C.
Shore D Hardness — 50
Density — 0.960

The compositions employed in the present invention can consist essentially of or consist of materials set forth.

What is claimed is:

1. A process of preparing an ethylene polymer wax having a molecular weight of 1,000 to 10,000 consisting essentially of polymerizing a member of the group consisting of (1) ethylene and (2) a mixture of ethylene with a copolymerizable monomer selected from the group consisting of vinyl acetate, acrylic acid, methacrylic acid, maleic anhydride and a copolymerizable alpha monoolefin, said monomers being present in an amount to provide not over 50 mol % of the polymer units, in the presence of a free radical forming catalyst having a 10-hour half life at 30° to 60° C., said polymerization being carried out at a temperature of 20° to 120° C. and a pressure of 300 to 900 psi and in an inert or chain transfer solvent having a molecular weight of not over 200 and selected from the group consisting of hydrocarbons, ethers, carboxylic acid esters and ketones and mixtures thereof.

2. The process of claim 1 wherein the reaction is carried out at 40° to 120° C.

3. The process of claim 2 wherein the reaction is carried out at 40° to 70° C.

4. The process of claim 3 wherein the pressure is 600 to 900 psi.

5. The process of claim 1 wherein the catalyst is a peroxy catalyst.

6. The process of claim 5 wherein the solvent is selected from the group consisting of a hydrocarbon and a heterocyclic ether and mixtures thereof.

7. The process of claim 6 wherein the solvent is selected from the group consisting of hexane, benzene, propylene oxide, tetrahydrofuran, dioxolane and a mixture of hexane and tetrahydrofuran.

8. The process of claim 7 wherein the solvent is tetrahydrofuran.

9. The process of claim 8 wherein said member is ethylene.

10. The process of claim 9 wherein the temperature is 40° to 70° C.

11. The process of claim 10 wherein the pressure is 600 to 900 psi.

12. The process of claim 11 wherein the catalyst is t-butyl peroxy pivalate.

13. The process of claim 7 wherein the catalyst is dicyclohexylperoxydicarbonate or t-butyl peroxy pivalate.

14. The process of claim 1 wherein said member is ethylene.

15. The process of claim 14 wherein the solvent is a hydrocarbon or a cyclic ether and the catalyst is a peroxy catalyst.

16. The process of claim 15 wherein the temperature is 40° to 70° C.

17. The process of claim 1 wherein said member is a mixture of ethylene and said copolymerizable monomer.

18. The process of claim 17 wherein the solvent is a hydrocarbon or a cyclic ether and the catalyst is a peroxy catalyst.

19. A process of claim 18 wherein the temperature is 40° to 70° C.

20. The process of claim 1 wherein the solvent is an alkane, cycloalkane, aromatic hydrocarbon free of non-benzenoid unsaturation or a cyclic ether having 3 to 6 atoms in the ring of which 1 to 2 are ether oxygen atoms.

21. The process of claim 1 wherein (2) is a mixture of ethylene with (a) vinyl acetate, (b) acrylic acid, (c) methacrylic acid, (d) maleic anhydride or (e) propylene.

22. The process of claim 21 wherein said member is (2).

23. The process of claim 1 wherein the catalyst is a peroxy catalyst or azo catalyst.

24. The process of claim 23 wherein the catalyst is an azo catalyst.

25. The process of claim 24 wherein the catalyst is 2-6-butylazo-2-cyano-4-methoxy-4-methylpentane.

26. The process of claim 1 wherein the solvent is selected from the group consisting of a hydrocarbon, a heterocyclic ether, a ketone and a carboxylic acid ester and mixtures thereof.

27. The process of claim 26 wherein the solvent is selected from the group consisting of hexane, benzene, propylene oxide, tetrahydrofuran, dioxolane, acetone, ethyl acetate and a mixture of hexane and tetrahydrofuran.

* * * * *